(12) United States Patent
Onoyama et al.

(10) Patent No.: US 11,054,814 B2
(45) Date of Patent: Jul. 6, 2021

(54) ROBOT TEACHING DEVICE, AND ROBOT TEACHING METHOD

(71) Applicant: Kabushiki Kaisha Yaskawa Denki, Kitakyushu (JP)

(72) Inventors: Yoshifumi Onoyama, Kitakyushu (JP); Koichi Kuwahara, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 468 days.

(21) Appl. No.: 15/953,510

(22) Filed: Apr. 16, 2018

(65) Prior Publication Data

US 2018/0231965 A1 Aug. 16, 2018

Related U.S. Application Data

(63) Continuation of application No. PCT/JP2015/080863, filed on Oct. 30, 2015.

(51) Int. Cl.
*G05B 19/423* (2006.01)
*G05B 19/42* (2006.01)

(52) U.S. Cl.
CPC .......... *G05B 19/423* (2013.01); *G05B 19/42* (2013.01); *G05B 2219/39384* (2013.01); *G05B 2219/40099* (2013.01)

(58) Field of Classification Search
CPC ...... B25J 9/1671; B25J 9/0096; B25J 9/1612; B25J 9/1687; B25J 9/1697;
(Continued)

(56) References Cited

U.S. PATENT DOCUMENTS 5,600,759 A * 2/1997 Karakama ............ G05B 19/425
318/568.13
5,937,143 A * 8/1999 Watanabe .............. B25J 9/1671
700/264
(Continued)

FOREIGN PATENT DOCUMENTS

EP 1531028 A2 5/2005
EP 2862678 A2 4/2015
(Continued)

OTHER PUBLICATIONS

Office Action dated Oct. 8, 2019, for corresponding JP Patent Application No. 2017-547339.
(Continued)

*Primary Examiner* — Jason Holloway
(74) *Attorney, Agent, or Firm* — HEA Law PLLC

(57) ABSTRACT

To enhance the productivity of an offline teaching work by visualizing the working position, path, and the like of an end effector in offline teaching. A robot teaching device, includes: a teaching point marker display unit configured to display, on a GUI, teaching point markers for marking teaching points in a three-dimensional modeling space in which at least a three-dimensional model of a robot including an end effector and a three-dimensional model of a work piece are arranged, the teaching points serving as target passing points of the end effector; a joined path display unit configured to display, on the GUI, a joined path, which is a path connecting successive points among the teaching points to each other; and a changing point marker display unit configured to display, on the GUI, a changing point marker marking a point at which a working state of the end effector changes.

9 Claims, 5 Drawing Sheets

(58) Field of Classification Search
CPC .......... G05B 2219/40053; G05B 2219/45063; G05B 2219/23007; G05B 2219/31; G05B 2219/23456; G05B 19/423; G05B 19/42; G05B 2219/39384; G05B 2219/40099; Y10S 901/47; Y10S 901/31

See application file for complete search history.

(56) References Cited

U.S. PATENT DOCUMENTS

| | | |
|---|---|---|
| 6,167,328 A | 12/2000 | Takaoka et al. |
| 2004/0189631 A1* | 9/2004 | Kazi ..................... B25J 9/1671 345/418 |
| 2004/0193321 A1* | 9/2004 | Anfindsen ............ G05B 19/425 700/257 |
| 2005/0049749 A1* | 3/2005 | Watanabe .............. B25J 9/1671 700/245 |
| 2005/0107921 A1 | 5/2005 | Watanabe et al. |
| 2005/0149231 A1 | 7/2005 | Pretlove et al. |
| 2005/0256611 A1* | 11/2005 | Pretlove ................. G05B 19/42 700/264 |
| 2006/0255758 A1* | 11/2006 | Takahashi ............ G05B 19/425 318/568.13 |
| 2007/0083291 A1* | 4/2007 | Nagatsuka ............. G05B 19/42 700/252 |
| 2012/0123590 A1* | 5/2012 | Halsmer ................ B25J 9/1656 700/264 |
| 2014/0236565 A1 | 8/2014 | Kuwahara |
| 2014/0277737 A1 | 9/2014 | Sekiyama et al. |
| 2015/0112482 A1* | 4/2015 | Kuwahara .............. B25J 9/1684 700/252 |
| 2016/0059413 A1* | 3/2016 | Ogata .................... B25J 9/1666 700/186 |
| 2018/0264646 A1* | 9/2018 | Sugaya ............... G06F 3/04842 |

FOREIGN PATENT DOCUMENTS

| | | |
|---|---|---|
| JP | S61-217804 A | 9/1986 |
| JP | H08-174454 A | 7/1996 |
| JP | H09-85655 A | 3/1997 |
| JP | H09-146621 A | 6/1997 |
| JP | H10-291183 A | 11/1998 |
| JP | H11-345018 A | 12/1999 |
| JP | 2000-075912 A | 3/2000 |
| JP | 2004-243516 A | 9/2004 |
| JP | 2005-066797 A | 3/2005 |
| JP | 2005-149016 A | 6/2005 |
| JP | 2010-179388 A | 8/2010 |
| JP | 2012-198600 A | 10/2012 |
| JP | 2014-161921 A | 9/2014 |
| JP | 2014-180707 A | 9/2014 |
| JP | 2015-077661 A | 4/2015 |

OTHER PUBLICATIONS

Office Action dated Mar. 26, 2019, for corresponding JP Patent Application No. 2017-547339 and English translation threof.

Office Action dated May 12, 2020, for corresponding JP Patent Application No. 2017-547339 with partial English translation.

Search Report dated Mar. 6, 2019, for corresponding EP Patent ApplicationNo. 15907342.8.

The Office Action dated Apr. 7, 2020, for corresponding EP Patent Application No. 15907342.8.

English translation of the International Search Report for PCT/JP2015/080863.

Office Action dated Jul. 22, 2020, for corresponding CN Patent Application No. 201580084214.4.

Office Action dated Feb. 10, 2021, for corresponding CN Patent Application No. 201580084214.4 with English translation pp. 1-22.

Office Action dated Jan. 19, 2021, for corresponding JP Patent Application No. 2017-547339 with partial English translation pp. 1-4.

"Computing Bezier curves using de Casteljau's algorithm" codiecodemonkey from YouTube dated Mar. 22, 2010, pp. 1-1.

Office Action dated Dec. 23, 2020, for corresponding EP Patent Application No. 15907342.8 pp. 1-6.

* cited by examiner

ROBOT TEACHING DEVICE, AND ROBOT TEACHING METHOD

INCORPORATION BY REFERENCE

The present disclosure contains subject matter related to that disclosed in International Patent Application PCT/JP2015/080863 filed in the Japan Patent Office on Oct. 30, 2015, the entire contents of which are hereby incorporated by reference.

BACKGROUND OF THE INVENTION

Field of the Invention

The present invention relates to a robot teaching device, a computer program, and a robot teaching method.

Description of the Related Art

A method called offline teaching is becoming widely popular in recent years. The method involves teaching a teaching playback type robot in a virtual space by utilizing computer graphics, without using a real machine.

In JP2014-161921A, there is described a robot simulator, which generates a virtual image including an operation handle capable of operating a three-dimensional coordinate axes having a given control point of a robot as the origin, and receives an operator's operation performed on the operation handle.

SUMMARY OF THE INVENTION

A general-purpose industrial robot commonly has an end effector, for example, a robot hand, a welding torch, or a spray gun, attached to the tip of its arm, and a given work is performed by affecting a work piece in some way with the end effector. The ability to predict the working position of the end effector and an accurate path of the end effector is therefore important in order to yield a desired result.

According to one embodiment of the present invention, there is provided a robot teaching device, including: a teaching point marker display unit configured to display, on a GUI, teaching point markers for marking teaching points in a three-dimensional modeling space in which at least a three-dimensional model of a robot including an end effector and a three-dimensional model of a work piece are arranged, the teaching points serving as target passing points of the end effector; a joined path display unit configured to display, on the GUI, a joined path, which is a path connecting successive points among the teaching points to each other; and a changing point marker display unit configured to display, on the GUI, a changing point marker for marking a point at which a working state of the end effector changes.

According to one embodiment of the present invention, there is provided a robot teaching device, including: a teaching point marker display unit configured to display, on a GUI, teaching point markers for marking teaching points in a three-dimensional modeling space in which at least a three-dimensional model of a robot including an end effector and a three-dimensional model of a work piece are arranged, the teaching points serving as target passing points of the end effector; and a joined path display unit configured to display, on the GUI, a joined path, which is a path connecting successive points among the teaching points to each other, as a curve based on what type of move command corresponds to each of the teaching points.

According to one embodiment of the present invention, there is provided a robot teaching method, including: displaying, on a GUI, teaching point markers for marking teaching points in a three-dimensional modeling space in which at least a three-dimensional model of a robot including an end effector and a three-dimensional model of a work piece are arranged, the teaching points serving as target passing points of the end effector; displaying, on the GUI, a joined path, which is a path connecting successive points among the teaching points to each other; displaying, on the GUI, a changing point marker for marking a point at which a working state of the end effector changes; and operating, on the GUI, at least one of the teaching point markers or the changing point marker, to thereby teach the robot.

According to one embodiment of the present invention, there is provided a robot teaching method, including: displaying, on a GUI, teaching point markers for marking teaching points in a three-dimensional modeling space in which at least a three-dimensional model of a robot including an end effector and a three-dimensional model of a work piece are arranged, the teaching points serving as target passing points of the end effector; displaying, on the GUI, a joined path, which is a path connecting successive points among the teaching points to each other, as a curve based on what type of move command corresponds to each of the teaching points, which serve as target passing points; and operating, on the GUI, at least the teaching point markers, to thereby teach the robot.

DESCRIPTION OF THE EMBODIMENTS

Figure 1:
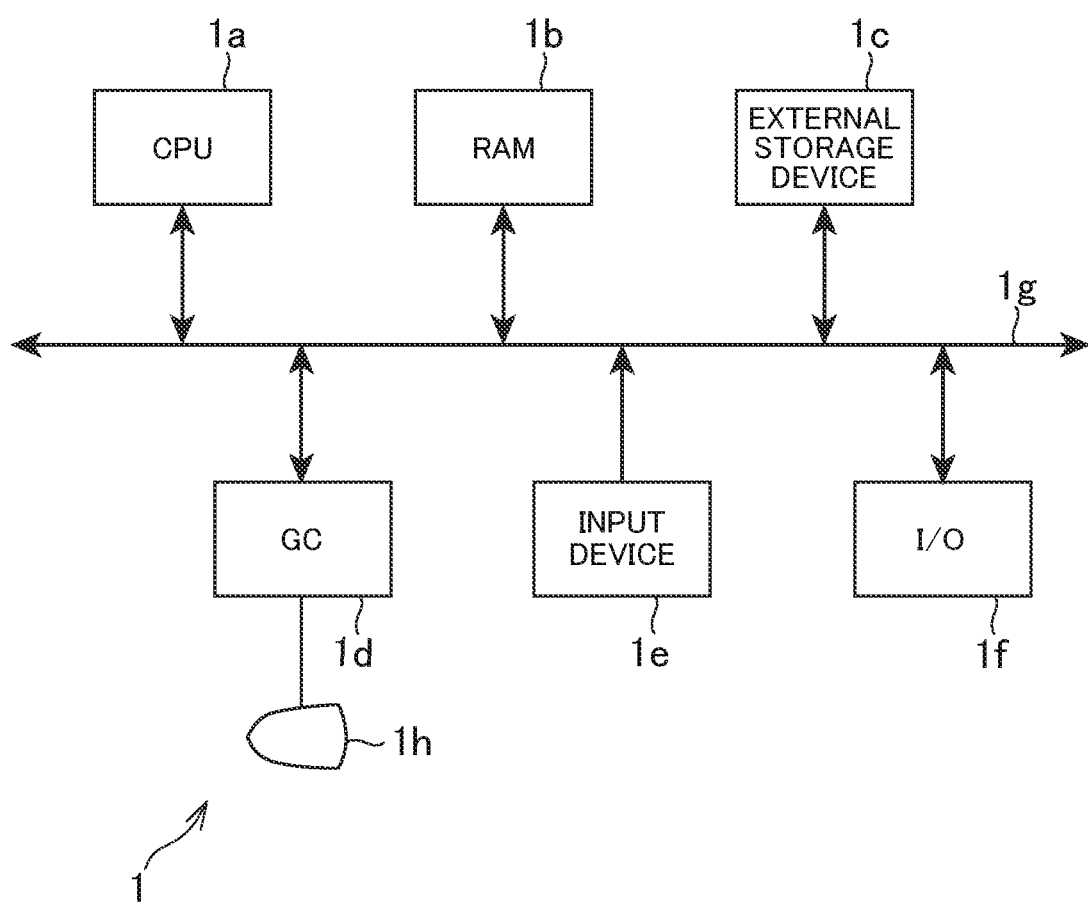
FIG. 1 is a block diagram for illustrating an example of the physical configuration of a robot teaching device according to an embodiment of the present invention.

FIG. 1 is a block diagram for illustrating an example of the physical configuration of a robot teaching device 1 according to an embodiment of the present invention. A general computer can be used as the robot teaching device 1, and this embodiment, too, uses a general computer in which a central processing unit (CPU) 1a, a random access memory (RAM) 1b, an external storage device 1c, a graphic controller (GC) 1d, an input device 1e, and an input/output (I/O) 1f are connected by a data bus 1g in a manner that allows the components to exchange an electric signal with one another. The external storage device 1c is a device capable of statically recording information, for example, a hard disk drive (HDD) or a solid state drive (SSD). A signal from the GC 1d is output to a monitor 1h on which a user visually recognizes an image, for example, a cathode ray tube (CRT) monitor or what is called a flat panel display, to be displayed as an image. The input device 1e is a device through which the user inputs information, for example, a keyboard, a mouse, or a touch panel. The I/O 1f is an interface through which the robot teaching device 1 exchanges information with an external device. An application program for controlling a computer so that the computer functions as the robot teaching device 1 is installed in the external storage device 1c, and as the need arises, read onto the RAM 1b to be executed by the CPU 1a. The application program may be provided after being recorded on an appropriate computer-readable information recording medium, for example, an optical disc, a magneto-optical disc, or a flash memory, or may be provided via the Internet or other information communication lines. The application program may also be provided in the form of what is called cloud computing in which functions of the robot teaching device 1 are provided by a server connected to an external network via the I/O 1f.

Figure 2:
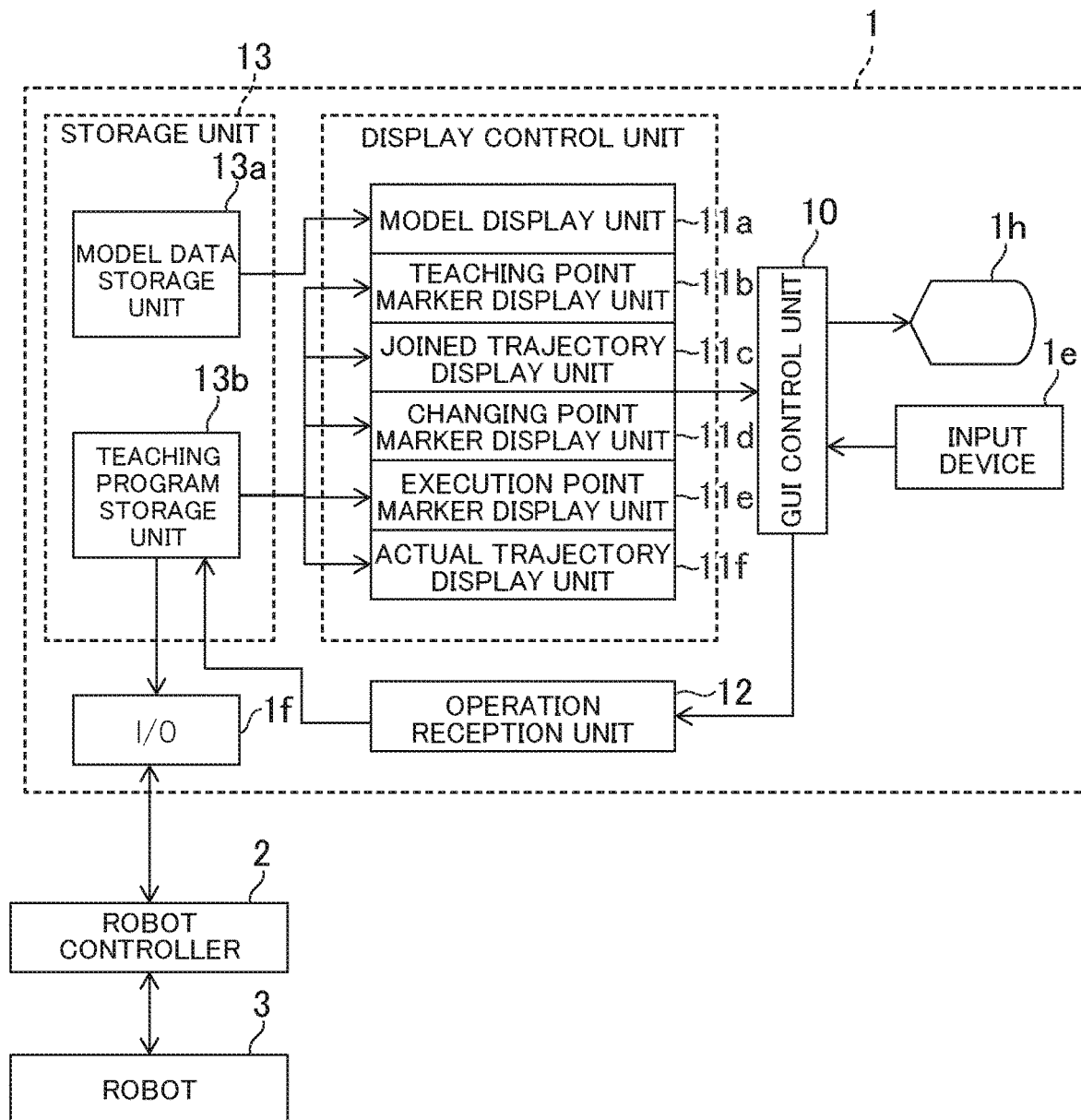
FIG. 2 is a function block diagram for illustrating an example of the functional configuration of the robot teaching device according to the embodiment of the present invention.

FIG. 2 is a function block diagram for illustrating an example of the functional configuration of the robot teaching device 1 according to the embodiment of the present invention. Function blocks illustrated in FIG. 2 are implemented virtually with the use of the above-mentioned physical configuration of the robot teaching device 1, for example, by running a given program on the CPU 1a and allocating an area of the RAM 1b or of the external storage device 1c to store given information, and are illustrated individually by focusing on functions of the robot teaching device 1. The function blocks of FIG. 2 therefore do not necessarily mean that the physical configuration of the robot teaching device 1, or a program executed by the robot teaching device 1 itself, is divided on a function block-by-function block basis. Not all of the functions of the robot teaching device 1 are illustrated in FIG. 2, and functions of little technical relevance to the present invention are omitted from FIG. 2.

A graphical user interface (GUI) control unit 2 displays an image generated by a display control unit 11 on the monitor 1h, and hands over the operator's operation on the input device 1e to an operation reception unit 12 as operation that is performed on the image displayed on the monitor 1h, thereby making the operation visual to the operator.

The display control unit 11 includes a model display unit 11a, a teaching point marker display unit 11b, a changing point marker display unit 11d, an execution point marker display unit 11e, and an actual path display unit 11f. The display control unit 11 generates three-dimensional graphics of, at least, a robot 3, which has an end effector, and a work piece based on model data, which is obtained from a storage unit 13. The display control unit 11 also generates three-dimensional graphics of teaching points for the robot 3, three-dimensional graphics of various markers based on data of various execution commands, which include markers for the end effector, and three-dimensional graphics of a path, based on a teaching program obtained from the storage unit 13. The display control unit 11 outputs the generated three-dimensional graphics to the GUI control unit 10 to display the three-dimensional graphics. The types and display modes of the teaching points, the various markers, and the path are described later.

The storage unit 13 includes a model data storage unit 13a storing a three-dimensional model of the robot 3, which has an end effector, and a three-dimensional model of a work piece, and a teaching program storage unit 13b storing a teaching program, which is executed by the robot 3. The three-dimensional models of the robot 3 and of a work piece may be created by a known configuration (not shown) with the use of the robot teaching device 1 itself, or may be model data created separately by a three-dimensional CAD to be read and stored, or model data provided by a maker or other vendors to be read and stored. The teaching program storage unit 13b initially stores no teaching program, and may store a teaching program newly created by the robot teaching device 1 itself, or an existing teaching program read from a robot controller 2 or other places.

The teaching program created or edited by the robot teaching device 1 and stored in the teaching program storage unit 13b is transferred to the robot controller 2, which is connected to the robot teaching device 1 via the I/O 1f, to be used to control the robot 3. During the creation or editing of a teaching program by the robot teaching device 1, the robot teaching device 1 and the robot controller 2 are not always required to be connected, and the robot teaching device 1 is capable of creating or editing a teaching program alone (what is called offline teaching). The connection between the robot teaching device 1 and the robot controller is not necessarily a direct wire connection as well, and may take a mode in which data is transmitted to and received from a remote site over a communication network.

Figure 3:
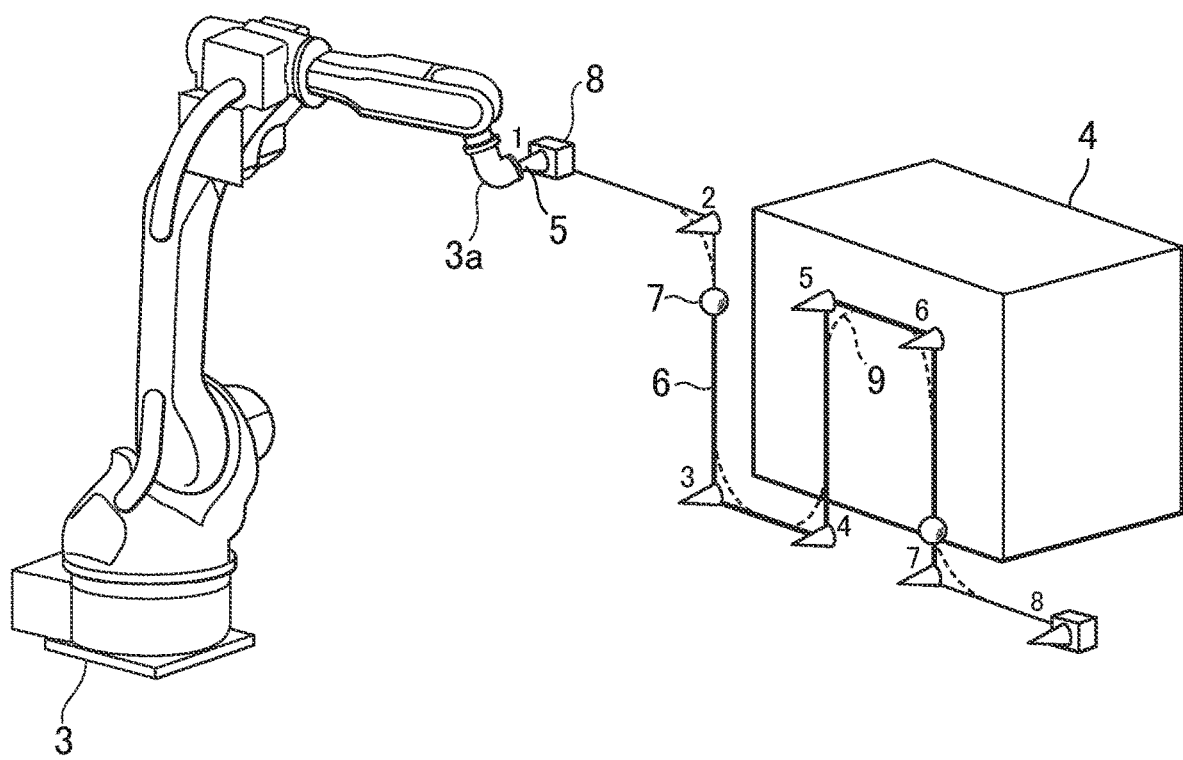
FIG. 3 is a diagram for illustrating an example of a GUI screen displayed on a monitor by a GUI control unit.

FIG. 3 is a diagram for illustrating an example of a GUI screen displayed on the monitor 1h by the GUI control unit 10. The model display unit 11a generates a three-dimensional image of the robot 3 with an end effector 3a attached to its tip and a three-dimensional image of a work piece 4, arranges the generated three-dimensional images in a three-dimensional modeling space, and displays the arranged images in the screen. The position and direction of the view point with respect to the three-dimensional modeling space displayed in the screen, and the magnification and the like of the displayed images are appropriately changed by the GUI control unit 10 under an instruction given from the operator with the use of the input device 1e. The end effector 3a in this embodiment is assumed to be a spray gun as an example. The work piece 4, which is illustrated here as a simple rectangular solid, can be any model, for example, the body of an automobile.

The positions of teaching points in the three-dimensional modeling space, which are points to be passed by a reference point of the end effector 3a when the robot 3 is in action, are also displayed in the screen as teaching point markers 5 (only the first one out of the teaching point markers illustrated in FIG. 4 is denoted by the reference number 5 as a representative) by the teaching point marker display unit 11b. The teaching point markers 5 here are displayed as circular cones. The shape, color, and size of teaching point markers can be changed appropriately by the operator.

A teaching point is none other than target coordinates of a move command to the robot 3 in the teaching program stored in the teaching program storage unit 13b. For example, when the teaching program includes a command "MOVL x y z" as a command for causing a control reference point of the robot 3, here, the reference point of the end effector 3a, to move linearly from the current point to coordinates (x, y, z), the point (x, y, z) is extracted as a teaching point by the teaching point marker display unit 11b, and one of the teaching point markers 5 is displayed at a corresponding point. There are eight teaching point markers 5 in the illustrated example, which means that eight move commands are included in the teaching program of this example. A serial number indicating a place in the order of passage of the end effector 3a is displayed by the side of each teaching point marker 5.

A joined path 6, which is a path joining successive teaching points to each other, is also displayed in the screen by a joined path display unit 11c. The joined path 6 is the path of the passage of the end effector 3a when the robot 3 operates ideally, namely, if the robot 3 acts at a very low speed. In actual operation, a gap between the path of the actual passage of the end effector 3a (this is referred to as "actual path 9") and the joined path 6 widens as the robot 3 operates at a higher speed, as described later. The joined path 6 can therefore be said as an ideal path of the end effector 3a, and, by tracing the joined path 6, the operator can visually recognize what action is intended for the robot 3 by the teaching program.

As illustrated in FIG. 3, the joined path 6 in this example has a portion represented by a thin line and a portion represented by a bold line, which are described later. The joined path 6 is not necessarily limited to a straight line connecting successive teaching points to each other. When a move command in the teaching program that corresponds to a teaching point is a command for a move at the highest speed (namely, a moving method in which motors of the robot 3 are driven linearly toward their respective target values), the joined path 6 is a slightly complicate, curved path reflecting the posture of the robot 3. When the move command is a command for an arc move or an otherwise curved move, the joined path 6 is displayed as the instructed curve. In other words, the joined path display unit 11c displays the joined path 6 as a curve based on the type of a move command that corresponds to a teaching point serving as a target passing point.

Changing point markers 7 each indicating a point at which the working state of the end effector 3a changes are also displayed in the screen by the changing point marker display unit 11d (only the first one out of the changing point markers illustrated in FIG. 4 is denoted by the reference number 7 as a representative). The changing point markers 7 are displayed as spheres here, but can be changed in shape and other aspects by the operator as is the case for the teaching point markers 5 described above.

The working state of the end effector 3a here particularly means a working state in which the effect on the work piece 4 changes, in this example, a switch between ON and OFF of the spray. A change in the working state of the end effector 3a is extracted by the changing point marker display unit 11d in response to a relevant command in the teaching program, and a point in the three-dimensional modeling space is identified. For example, when the teaching program includes a "SPYON" command, which is a command to turn on the spray, as a command causing a change in the working state of the end effector 3a, the changing point marker display unit 11d displays one of the changing point markers 7 at the position of a teaching point at which this command is executed. If the position of the changing point marker 7 coincides with the position of the teaching point marker 5, or one of execution point markers 8, which are described later, the changing point marker 7 and the teaching point marker 5, or the execution point marker 8, may be displayed overlapped with each other, or may be displayed next to each other in order to avoid an overlap.

When the relevant command in the teaching program specifies, as the timing of changing the working state, a relative distance or a relative time from an adjacent teaching point, the changing point marker display unit 11d determines the position of the changing point marker 7 by taking the relative distance or the relative time into account. For example, when a command to turn on the spray as a command causing a change in the working state of the end effector 3a specifies a relative time from the next teaching point, as in "SPYON ANT=1.00 sec" (this indicates that the spraying is started when 1.00 second elapses after the end effector 3a passes the next teaching point), the changing point marker display unit 11d determines a point on the joined path 6 at which the spray is turned on from the next teaching point by taking into account the moving speed of the robot 3. In FIG. 3, the changing point marker 7 illustrated with the reference number attached is displayed at a point on the joined path 6 that is reached after a specified time elapses or after a specified distance is traveled after the teaching point 5 numbered 2. The changing point marker 7 without the reference number attached is displayed at a point on the joined path 6 that precedes the teaching point marker 5 numbered 7 by the specified time or the specified distance.

With the changing point marker 7 marking a point on the joined path 6 at which the working state of the end effector 3a actually changes in this manner, the operator can visually confirm a point at which the end effector 3a affects the work piece 4. The operator can visually grasp a working state changing point in the three-dimensional modeling space also when a relative distance or a relative time from one teaching point is specified as the timing of changing the working state.

The joined path display unit 11c may change the mode of displaying the joined path 6 in a manner suited to a change in the working state of the end effector 3a. For example, a section in which the spray is turned on is displayed by a bold line and a section in which the spray is turned off is displayed by a thin line as illustrated in FIG. 3. The display mode of the joined path 6 may be changed not only by changing the thickness of the line but also by changing the color or type of the line. When the end effector undergoes three or more types of changes in state, a different mode of displaying the joined path 6 may be selected for each state. The display mode of the joined path 6, which changes at the position of the changing point marker 7 in this example, may be changed at the start of each section between teaching points. For example, sections including a portion in which the spray is turned on (e.g., a section between the teaching point markers numbered 2 and 3 and a section between the teaching point markers numbered 6 and 7 in FIG. 4) are displayed by bold lines as spray-ON sections.

By varying the display mode of the joined path 6 depending on the working state of the end effector 3a in this manner, the operator can visually confirm the range in which the work piece 4 is affected by the end effector 3a.

The execution markers 8 each indicating a point at which a specified command is executed are also displayed in the screen by the execution point marker display unit 11e. The execution point markers 8 are displayed as cubes here, but can be changed in shape and other aspects by the operator as is the case for the teaching point markers 5 and changing point markers 7 described above.

The specified command here is a command included in the teaching program and different from the move command and the command causing a change in the working state of the end effector 3a, which are described above, and is particularly a command convenient when displayed on the GUI. A "PAINTSET" command qualifies here as the specified command, and specifies initial parameters of the spray gun, for example, an opening degree of a valve and a paint to be used. When it is necessary to specify, in advance, operation parameters of the end effector 3a in the teaching program, the execution point marker 8 displayed to mark a point at which the command is executed in this manner enables the operator to visually confirm on the GUI that operation parameters of the end effector 3a are set and, in addition, to set or change an operation parameter of the end effector 3a on the GUI as described later.

A command in the teaching program that is displayed as one of the execution point markers 8 is not limited to a command to set an operation parameter of the end effector 3a, and can be any command. In particular, the operator may specify which command is to be displayed as one of the execution point markers 8. The execution point markers 8 corresponding to different commands may be displayed in different modes (for example, different colors, shapes, or sizes).

The teaching point markers 5, the changing point markers 7, and the execution point markers 8 are thus displayed on the GUI in modes distinguishable from one another. This enables the operator to visually grasp the positions of teaching points, which define the path of the end effector 3a, the position of the action of the end effector 3a, and points at which desired commands are executed, while discriminating the three from one another.

Each marker can be added or edited by the same operation as the existing GUI operation performed on three-dimensional graphics. For instance, the position of a marker can be changed by the operator by dragging the marker on the GUI. The GUI may also be configured so that a dialogue box for performing various types of operation is displayed when the operator specifies an appropriate marker on the GUI. The specification of a marker may enable the operator to, for example, input the coordinates of a corrected position of the specified marker, edit a command in the teaching program that corresponds to the specified marker, add a new marker before or after the specified marker, and delete the specified marker. A command corresponding to the added marker is added to the teaching program, and a command corresponding to the deleted marker is deleted from the teaching program or commented out. Alternatively, a new marker may be inserted between successive markers by specifying an arbitrary point on the joined path 6, or a new marker may be added by specifying an appropriate point on the GUI. In this case, too, a command corresponding to the new marker is added to the teaching program. Noteworthy operation on the GUI is the operation of dragging one of the changing point markers 7 along the joined path 6, thereby specifying a point at which the working state of the end effector 3a changes as a relative position or a relative time with respect to a teaching point. This changes the specification of a relative position or a relative time in a corresponding command in the teaching program (e.g., the "SPYON" command described above). Whether the relative position or the relative time is to be used can be determined by which of the two is used in the current command. It is recommended to prescribe that one of the two, for example, the relative distance, be used when the current command does not specify (for instance, when no relative position is specified). In this operation, the range in which the changing point marker 7 can be dragged is limited to the area on the joined path 6.

In this manner, a teaching program is created by adding markers on the GUI, and is edited by operating a marker on the GUI. The operator's operation received by the GUI control unit 10 is interpreted by the operation reception unit 12 and converted into a command of a teaching program to be stored as a teaching program in the teaching program storage unit 13b.

When the operator specifies an arbitrary marker in the screen, the model display unit 11a may generate and display three-dimensional images depicting the posture of the robot 3 and the work piece 4 at a time point specified by the marker. This enables the operator to check the posture of the robot at work and, when the robot 3 and the work piece 4 move during work (for instance, when the robot 3 and the work piece 4 are each put on a wheeled platform or a similar carrier to work on or to be worked while being moved), to visually grasp the positional relation between the robot 3 and the work piece 4 at each work time point. When the robot 3 or the work piece 4 moves during work, the direction and speed of the movement are specified in advance.

The actual path 9 of the movement of the end effector 3a may also be displayed in the screen by the actual path display unit 11f. In the control of a multi-articulated robot, a gap between the actual path 9 of the end effector 3a attached to the tip of the robot 3 and an ideal path (equivalent to the joined path 6) connecting teaching points to each other generally widens as the robot 3 operates at a higher speed. While the amount of the gap depends on the operation speed of the robot 3, control parameters of the respective motors, the tip mass of the robot, and the like, the actual path 9 can be obtained by simulation or path calculation when the specifics of the robot 3 and the end effector 3a are known.

The actual path display unit 11f obtains the actual path 9 by simulation or path calculation, and displays the obtained actual path 9 on the GUI. The actual path 9 is displayed in a mode different from that of the joined path 6 as illustrated in FIG. 3, in which a broken line represents the actual path 9. This enables the operator to check the actual path 9 of the actual passage of the end effector 3a in addition to the joined path 6, which is an ideal path of the end effector 3a.

When the end effector 3a is a spray gun as in this example, and the actual path 9 is a rounded path drawn inside corner portions of the joined path 9 as illustrated in FIG. 3, the effect on the work piece 4 in areas around the rounded portions of the path can be unsatisfactory and manifested as an uneven coat or a missed spot in a coat. A countermeasure practiced in the past is an adjustment of the actual path 9 in which the operator intentionally changes the positions of teaching points based on the results of painting by an actual machine, empirical findings, and the result of separately executed simulation so that the actual path 9 matches a desired path. According to the findings of the inventors of the present invention, however, this adjustment work requires running an actual machine and empirical knowledge, which means a considerable amount of skill, time, and cost, is required, and is a heavy burden in the execution of offline teaching.

To address the issue, the actual path 9 is displayed in a three-dimensional modeling space along with the teaching point markers 5, the joined path 6, and the work piece 4 as in this embodiment, thereby enabling the operator to visually change the positions of teaching points while checking the relation of the actual path 9 to the teaching points and the work piece 4. The operator's burden and the cost in offline teaching are accordingly reduced significantly, with the result that the productivity is improved markedly and that skill is not required of the operator.

The teaching point marker display unit 11b dynamically changes the positions of the teaching point markers 5 when the positions of teaching points are changed with the use of the GUI. Specifically, when the operator drags any one of the teaching point markers 5, the dragged teaching point marker 5 changes its displayed position in real time in response to the operator's operation. The joined path display unit 11c and the actual path display unit 11f may dynamically change the displayed joined path 6 and the displayed actual path 9, respectively, in response to this dynamic positional change of the teaching point marker 5. In short, when the operator drags any one of the teaching point markers 5 to change the display position of the dragged teaching point marker 5, the joined path 6 and the actual path 9 follow the change in real time to undergo a change themselves.

This, in particular, the real-time change of the actual path 9, enables the operator to fit the actual path 9 to a desired path while changing the positions of the teaching point markers 5 in real time.

Figure 4A:
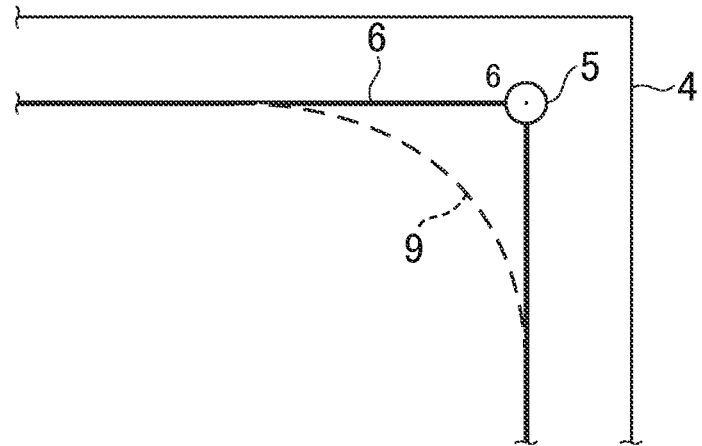
FIG. 4A is an enlarged view of an area around a teaching point marker numbered 6 in FIG. 3, which is viewed from a spraying direction in which the area is sprayed.

FIG. 4A is an enlarged view of an area around one of the teaching point markers 5 illustrated in FIG. 3 that is numbered 6, and is viewed from a spraying direction in which the area is sprayed. In the area around the teaching point marker 5 that is numbered 6, the actual path 9 passes points far inside a corner of the joined path 6 as illustrated in FIG. 4A, which may cause a missed spot in a coat around a corner of the work piece 4.

Figure 4B:
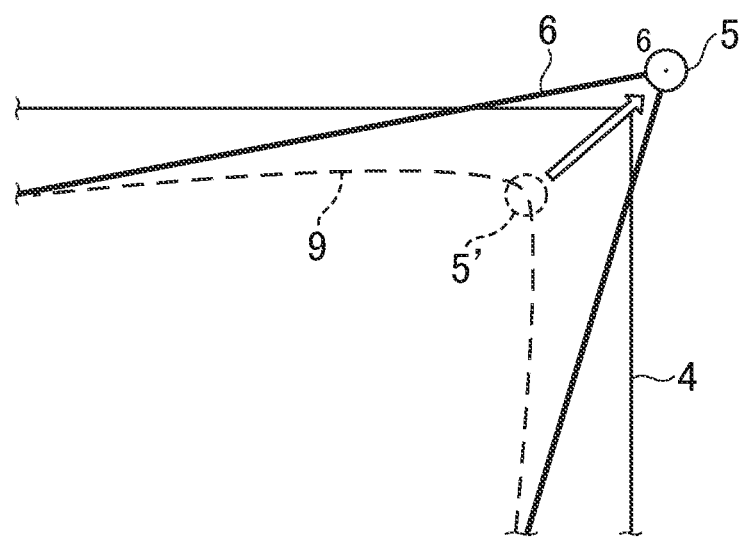
FIG. 4B is a diagram for illustrating an example of an operator's operation performed in FIG. 4A.

To address the issue, the operator drags the teaching point marker 5 that is numbered 6 in an upper right direction in FIG. 4B from the original position (indicated by a broken line and denoted by a reference number 5') of the teaching point marker as illustrated in FIG. 4B. The joined path 6 and the actual path 9 change in a manner illustrated in FIG. 4B in response to this operation. The operator adjusts the position of the teaching point marker 5 so that the actual path 9 matches a desired path, and then stops dragging the teaching point marker 5 to enter the adjusted position, thereby easily obtaining the actual path 9 close to the desired path. In this embodiment, the actual path 9 can thus be made to fit the shape of the work piece 4 very easily, without requiring activating an actual machine or empirical knowledge from seasoned practice.

Figure 5:
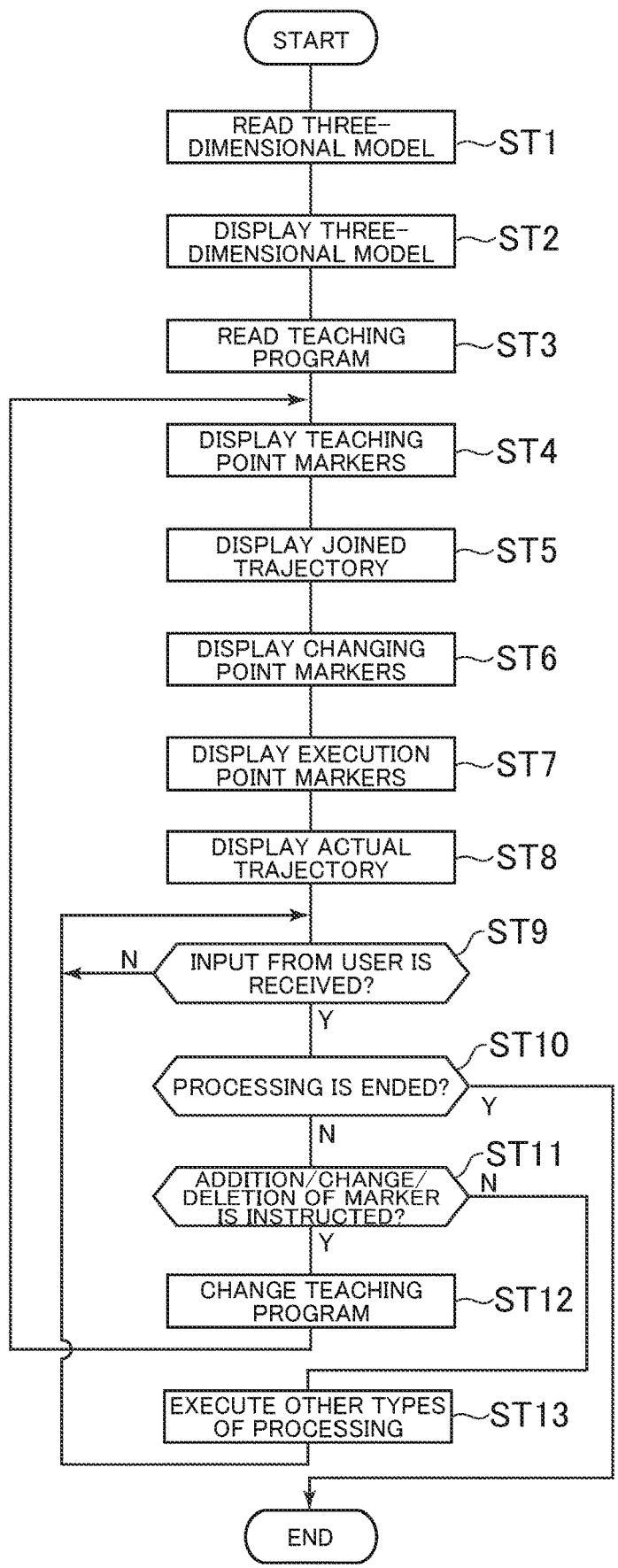
FIG. 5 is a flow chart for illustrating an example of the operation of the robot teaching device according to the embodiment of the present invention.

The following description is given with reference to a flow chart of FIG. 5 on the operation of the robot teaching device 1 according to this embodiment, in particular, a part relevant to the present invention.

First, in Step ST1, the model display unit 11a reads model data of the robot 3, which has the end effector 3a, and a three-dimensional model of the work piece 4 out of the model data storage unit 13a. In Step ST2, the robot 3 and the work piece 4 are arranged in a three-dimensional modeling space, and displayed on the GUI.

In Step ST3, a teaching program is read out of the teaching program storage unit 13b. Based on the teaching program, the teaching point marker display unit 11b displays the teaching point markers 5 in the three-dimensional modeling space on the GUI in Step ST4, the joined path display unit 11c displays the joined path 6 in the three-dimensional modeling space on the GUI in Step ST5, the changing point marker display unit 11d displays the changing point markers 7 in the three-dimensional modeling space on the GUI in Step ST6, the execution point marker display unit 11e displays the execution point markers 8 in the three-dimensional modeling space on the GUI in Step ST7, and the actual path display unit 11f displays the actual path 9 in the three-dimensional modeling space on the GUI in Step ST8.

In Step ST9, an input to the GUI from the operator is waited for. When an input from the operator is received, whether the instruction from the operator is an instruction to end the processing is determined in Step ST10. When the answer is positive (meaning that the processing is to be ended), the operation of the robot teaching device 1 is ended, and, otherwise, the processing proceeds to Step ST11.

In Step ST11, whether or not the instruction from the operator is about one of the addition, change, and deletion of a marker is determined. When the answer is positive (meaning that the instruction is about one of the addition, change, and deletion of a marker), the processing proceeds to Step ST12, in which the operation reception unit 12 changes the teaching program as instructed in the input from the operator, and the change is stored in the teaching program storage unit 13b. The processing then returns to Step ST4 to immediately display and reflect the change made to the teaching program on the GUI as changes in the teaching point markers 5, the joined path 6, the changing point markers 7, the execution point markers 8, and the actual path 9. The operator's operation performed on a marker is reflected on the GUI in real time in this manner. The teaching point marker display unit 11b, the joined path display unit 11c, the changing point marker display unit 11d, the execution point marker display unit 11e, and the actual path display unit 11f are required to change what is displayed on the GUI only when the display is required to be changed, and may omit redoing the display when the operator's operation does not cause a change in display, to thereby lessen the load on the robot teaching device 1.

When the answer is negative (meaning that the instruction is about none of the addition, change, and deletion of a marker) in Step ST11, the processing proceeds to Step ST13 to execute processing other than the addition, change, and deletion of a marker as specified in the operator's instruction. After the instructed processing is finished, there is no need to change what is displayed on the GUI, and the processing of the flowchart accordingly returns to Step ST8 to wait for a further input from the operator.

In the above, the embodiment according to the present invention is described. However, the specific configuration described in the embodiment is described as an example, and is not intended to limit the technical scope of the present invention to the embodiment. Various modifications may be made by a person skilled in the art to those disclosed embodiments. It is to be understood that the technical scope of the invention disclosed herein cover all such modifications. It should be understood by those skilled in the art that various modifications, combinations, sub-combinations and alterations may occur depending on design requirements and other factors insofar as they are within the scope of the appended claims or the equivalents thereof.

What is claimed is:

1. A robot teaching device comprising:
   a central processing unit (CPU) and memory, in communication with one another, the CPU and memory configured to implement:
   a teaching point marker display unit configured to display, on a GUI, teaching point markers for marking teaching points in a three-dimensional modeling space in which at least a three-dimensional model of a robot including an end effector and a three-dimensional model of a work piece are arranged, the teaching points serving as target passing points of the end effector;
   a joined path display unit configured to display, on the GUI, a joined path, which is a path connecting successive points among the teaching points to each other;
   a changing point marker display unit configured to display, on the GUI, a changing point marker for marking a point at which a working state of the end effector changes, wherein the working state of the end effector changes when an effect on the work piece changes, and
   an actual path display unit configured to display, on the GUI, an actual path, which is a path of movement of the end effector,
   wherein the teaching point marker display unit is configured to dynamically change a display position at which one of the teaching point markers is displayed when a position of one of the teaching points is changed by using the GUI, wherein the actual path display unit is configured to dynamically change the actual path by following the dynamic change of the display position of one of the teaching point markers when the position of the one of the teaching points is changed, and wherein the joined path display unit is configured to display the joined path as a curve based on what type of move command corresponds to each of the teaching points, which serve as target passing points.

2. The robot teaching device according to claim 1, further comprising an execution point marker display unit configured to display, on the GUI, an execution point marker for marking a point at which a specified command is executed.

3. The robot teaching device according to claim 1, wherein at least the teaching point markers and the changing point marker are displayed in modes distinguishable from each other.

4. The robot teaching device according to claim 1, wherein the changing point is specified by at least one of a relative distance or a relative time from one of the teaching points.

5. The robot teaching device according to claim 1, wherein the joined path display unit is configured to vary a mode of displaying the joined path, depending on the changing point.

6. A robot teaching device, comprising:
a central processing unit (CPU) and memory, in communication with one another, the CPU and memory configured to implement:
a teaching point marker display unit configured to display, on a GUI, teaching point markers for marking teaching points in a three-dimensional modeling space in which at least a three-dimensional model of a robot including an end effector and a three-dimensional model of a work piece are arranged, the teaching points serving as target passing points of the end effector;
a joined path display unit configured to display, on the GUI, a joined path, which is a path connecting successive points among the teaching points to each other, as a curve based on what type of move command corresponds to each of the teaching points, which serve as target passing points; and
an actual path display unit configured to display, on the GUI, an actual path, which is a path of movement of the end effector,
wherein the teaching point marker display unit is configured to dynamically change a display position at which one of the teaching point markers is displayed when a position of one of the teaching points is changed by using the GUI,
wherein the actual path display unit is configured to dynamically change the actual path by following the dynamic change of the display position of one of the teaching point markers when the position of the one of the teaching points is changed, and
wherein the joined path display unit is configured to display the joined path as a curve based on what type of move command corresponds to each of the teaching points, which serve as target passing points.

7. A robot teaching method, comprising:
displaying, on a GUI, teaching point markers for marking teaching points in a three-dimensional modeling space in which at least a three-dimensional model of a robot including an end effector and a three-dimensional model of a work piece are arranged, the teaching points serving as target passing points of the end effector;
displaying, on the GUI, a joined path, which is a path connecting successive points among the teaching points to each other;
displaying, on the GUI, a changing point marker for marking a point at which a working state of the end effector changes, wherein the working state of the end effector changes when an effect on the work piece changes; and
operating, on the GUI, at least one of the teaching point markers or the changing point marker, to thereby teach the robot; and
displaying, on the GUI, an actual path which is a path of movement of the end effector,
wherein the displaying of teaching point markers dynamically changes a display position at which one of the teaching point markers is displayed when a position of one of the teaching points is changed by using the GUI,
wherein the displaying of the actual path dynamically changes the actual path by following the dynamic change of the display position of one of the teaching point markers when the position of the one of the teaching points is changed, and
wherein the displaying of the joined path is displayed as a curve based on what type of move command corresponds to each of the teaching points, which serve as target passing points.

8. A robot teaching method, comprising:
displaying, on a GUI, teaching point markers for marking teaching points in a three-dimensional modeling space in which at least a three-dimensional model of a robot including an end effector and a three-dimensional model of a work piece are arranged, the teaching points serving as target passing points of the end effector;
displaying, on the GUI, a joined path, which is a path connecting successive points among the teaching points to each other, as a curve based on what type of move command corresponds to each of the teaching points, which serve as target passing points; and
operating, on the GUI, at least the teaching point markers, to thereby teach the robot; and
displaying, on the GUI, an actual path, which is a path of movement of the end effector,
wherein the displaying of teaching point markers dynamically changes a display position at which one of the teaching point markers is displayed when a position of one of the teaching points is changed by using the GUI,
wherein the displaying of the actual path dynamically changes the actual path by following the dynamic change of the display position of one of the teaching point markers when the position of the one of the teaching points is changed, and
wherein the displaying of the joined path is displayed as a curve based on what type of move command corresponds to each of the teaching points, which serve as target passing points.

9. A robot teaching device, comprising:
a teaching point marker display unit configured to display, on a GUI, teaching point markers for marking teaching points in a three-dimensional modeling space in which at least a three-dimensional model of a robot including an end effector and a three-dimensional model of a work piece are arranged, the teaching points serving as target passing points of the end effector;
a joined path display unit configured to display, on the GUI, a joined path, which is a path connecting successive points among the teaching points to each other; and a changing point marker display unit configured to display, on the GUI, a changing point marker for marking a point at which a working state of the end effector changes, wherein the working state of the end effector changes when an effect on the work piece changes; and an actual path display unit configured to display, on the GUI, an actual path, which is a path of movement of the end effector, wherein the teaching point marker display unit is configured to dynamically change a display position at which one of the teaching point markers is displayed when a position of one of the teaching points is changed by using the GUI, wherein the actual path display unit is configured to dynamically change the actual path by following the dynamic change of the display position of one of the teaching point markers when the position of the one of the teaching points is changed, and wherein the joined path display unit is configured to display the joined path as a curve based on what type of move command corresponds to each of the teaching points, which serve as target passing points.

* * * * *